(12) United States Patent
Alliger

(10) Patent No.: US 11,059,916 B2
(45) Date of Patent: Jul. 13, 2021

(54) CHROMIUM-BASED OLEFIN POLYMERIZATION CATALYSTS

(71) Applicant: ExxonMobil Chemical Patents Inc., Baytown, TX (US)

(72) Inventor: Glen E. Alliger, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 121 days.

(21) Appl. No.: 15/791,088

(22) Filed: Oct. 23, 2017

(65) Prior Publication Data

US 2018/0155462 A1 Jun. 7, 2018

Related U.S. Application Data

(60) Provisional application No. 62/431,249, filed on Dec. 7, 2016.

(51) Int. Cl.
| | |
|---|---|
| C08F 4/69 | (2006.01) |
| B01J 31/34 | (2006.01) |
| C08F 10/00 | (2006.01) |
| C08F 210/16 | (2006.01) |
| C07F 11/00 | (2006.01) |

(52) U.S. Cl.
CPC ............ *C08F 4/69* (2013.01); *B01J 31/34* (2013.01); *C08F 10/00* (2013.01); *C08F 210/16* (2013.01); *C07F 11/005* (2013.01)

(58) Field of Classification Search
None
See application file for complete search history.

(56) References Cited

U.S. PATENT DOCUMENTS

| | | | |
|---|---|---|---|
| 6,011,127 A | 1/2000 | Monoi et al. | |
| 2016/0168283 A1* | 6/2016 | Coperet | C08F 10/02 526/130 |

FOREIGN PATENT DOCUMENTS

| | | |
|---|---|---|
| EP | 2826795 | 1/2015 |
| WO | 98/07762 | 2/1998 |
| WO | 2015/007828 | 1/2015 |

OTHER PUBLICATIONS

Nocera et al. Inorg. Chem., 49, 10759-10761 (Year: 2010).*
Bradley et al. (Decompos. Organometal. Compounds Refract. Ceram., Metals, Metal Alloys, Proc. Int. Symp. / Decompos. Organometal. Compounds Refract. Ceram., Metals, Metal Alloys, Proc. Int. Symp. vol. and Issue No. pp. 119-129, Publication Date: 1968, Abstract cited in SciFinder (Year: 1968).*
Delley et al., "Proton transfers are key elementary steps in ethylene polymerization on isolated chromium(III) silicates," Proc Natl Acad Sci, Conley MP Inorg Chem, Aug. 12, 2014, pp. 11624-11629.
Conley et al., "Heterolytic Activation of C—H Bonds on CrIII—O Surface Sites is a Key Step in Catalytic Polymerization of Ethylene and Dehydrogenation of Propane," Inorganic Chemistry, vol. 54, No. 11, Jun. 1, 2015, pp. 5065-5078.
Sydora et al., "Low-Coordinate Chromium Siloxides: The "Box" [Cr(μ-Cl)(μ-OSitBu3)]4, Distorted Trigonal [tBu3SiO)3Cr][Na(benzene)] and [(tBu3SiO)3Cr][Na(dibenzo-18-c-6)], and Trigonal (tBu3SiO)3Cr," Inorganic Chemistry, vol. 44, No. 8, Apr. 1, 2005, pp. 2606-2618.
Odom et al., "Nitric Oxide Cleavage: Synthesis of Terminal Chromium(VI) Nitrido Complexes via Nitrosyl Deoxygenation," Journal of American Chemical Society, 1995, vol. 117, No. 24, pp. 6613-6614.
MacAdams et al., "A Chromium Catalyst for the Polymerization of Ethylene as a Homogeneous Model for the Phillips Catalyst," Journal of American Chemical Society, 2005, vol. 127, No. 4, pp. 1082-1083.
Yousif et al., "Catalytic formation of Asymmetric Carbodiimides at Mononuclear Chromium (II/IV) Bis(alkoxide) Complexes," Organometallics, 2015, vol. 34, pp. 5119-5128.
Yousif et al., "Synthesis of a mononuclear, non-square-planar chromium(II) bis(alkoxide) complex and its reactivity toward organic carbonyls and CO2," Dalton Transactions, 2016, vol. 45, pp. 9794-9804.
Groysman, et al., "Pseudotetrahedral d0, d1, and d2 Metal-Oxo Cores within a Tris(alkoxide) Platform," Inorganic Chemistry, 2010, vol. 49, No. 23, pp. 10759-10761.
Ballem et al., "Chromium (III) and chromium (IV) bis(trimethylsilyl) amido complexes as ethylene polymerization catalysts," Dalton Transactions, 2004, vol. 21, pp. 3431-3433.
Conley, M. P. et al. (2015) "Heterolytic Activation of C—H Bonds on Cr$^{III}$-0 Surface Sites is a Key Step in Catalytic Polymerization of Ethylene and Dehydrogenation of Propane," *Inorganic Chemistry*, v.54(11), pp. 5065-5078 (XP055398971).
Delley, M. F. et al. (2014) "Correction for "Proton Transfers are Key Elementary Steps in Ethylene Polymerization on Isolated Chromium(III) Silicates," by Heterolytic Activation of C—H Bonds on Cr(III)-0 Surface Sites is a Key Step in Catalytic Polymeri-zation of Ethylene and Dehydrogenation of Propane," *Proc. Nat'l Acad. Sci. Proc. Natl Acad. Sci. Conley MP Inorg. Chem.*, pp. 11624-11629, (XP055398970) http://www.pnas.org/content/111/32/11624.full.pdf?with-ds=yes.

(Continued)

Primary Examiner — Yun Qian

(57) ABSTRACT

This invention relates to a catalyst compound for an olefin polymerization catalyst system represented by the formula:

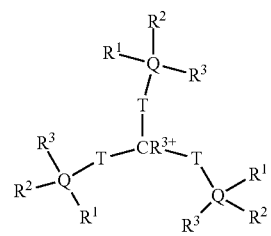

where each T is independently O, S, or N, each Q is independently C or Si; each $R^1$, $R^2$, and $R^3$ is a substituted $C_1$ to $C_{40}$ hydrocarbyl group, a $C_1$ to $C_{40}$ hydrocarbyl group, or a substituted heteroatom, provided that the sum of the molecular volume of $R^1$, $R^2$, and $R^3$ is greater than or equal to two times the molecular volume of an isopropyl group.

1 Claim, No Drawings

(56) References Cited

OTHER PUBLICATIONS

McAdams, L. A. et al. (2005) "A Chromium Catalyst for the Polymerization of Ethylene as a Homogeneous Model for the Phillips Catalyst," *J Am. Chem. Soc*, v.127(4), pp. 1082-1083.

Odom, A. L. et al. (1995) "Nitric Oxide Cleavage: Synthesis of Terminal Chromium(VI) Nitrido Complexes via Nitrosyl Deoxygenation," *Jrnl. of American Chemical Society*, v.117(24), pp. 6613-6614.

Sydora, O. et al. (2005) "Low-Coordinate Chromium Siloxides: The "Box" [Cr($\mu$-Cl)($\mu$-)Si$^t$Bu$_3$)]$_4$, Distorted Trigonal [($^t$Bu$_3$SiO)$_3$Cr][Na(benzene)] and [($^t$Bu$_3$SiO)$_3$Cr][Na(dibenzo-18-c-6], and Trigonal ($^t$Bu$_3$SiO)$_3$Cr," *Inorganic Chemistry*, v.44(8), pp. 2606-2618.

Yousif, M. et al. (2015) "Catalytic Formation of Asymmetric Carbodiimdes at Mononuclear Chromium (II/IV) Bis(alkoxide) Complexes," *Organometallics*, v.34(20), pp. 5119-5128.

Yousif, M. et al. (2016) "Synthesis of a mononuclear, non-square-planar chromium(ii) bis(alkoxide) complex and its reactivity toward organic carbonyls and $CO_2$," *Dalton Trans.*, v.45, pp. 9794-9804.

\* cited by examiner

CHROMIUM-BASED OLEFIN POLYMERIZATION CATALYSTS

PRIORITY CLAIM

This application claims priority to and the benefit of U.S. Ser. No. 62/431,249, filed Dec. 7, 2016 and is incorporated by reference in its entirety.

FIELD OF THE INVENTION

This invention relates to novel chromium-based olefin polymerization catalyst compounds, catalyst systems comprising the same and uses thereof.

BACKGROUND OF THE INVENTION

Olefin polymerization catalysts are of great use in industry. Hence, there is interest in finding new catalyst systems that increase the commercial usefulness of the catalyst and allow the production of polymers having improved properties.

Chromium represents an intriguing metal center from the perspective of olefin polymerization catalysis, as it is used industrially to produce polyethylene by the heterogeneous Phillips catalyst. However, despite several decades of study, this catalyst is poorly understood. Therefore, the study of chromium catalysts that include oxygen atom donors and are low coordinate would not only be of interest for the sake of novel catalyst design, but also may inform further studies of such heterogeneous catalysts.

Examples of recent academic research in this area include: 1) "*A Chromium Catalyst for the Polymerization of Ethylene as a Homogeneous Model for the Phillips Catalyst*" by MacAdams, L. A.; Buffone, G. P.; Incarvito, C. D.; Rheingold, A. L.; Theopold, K. H. *J. Am. Chem. Soc,* 2005, p. 127, 1082; 2) "*Catalytic Formation of Asymmetric Carbodiimdes at Mononuclear Chromium (III/IV) Bis(alkoxide) Complexes*" by Yousif, M.; Tjapkes, D. J.; Lord, R. L.; Groysman, S., *Organometallics* 2015, 34, p. 5119; 3) "*Synthesis of a mononuclear, non-square-planar chromium (II) bis(alkoxide) complex and its reactivity toward organic carbonyls and $CO_2$*", by Maryam Yousif, Alyssa C. Cabelof, Philip D. Martin, Richard L. Lord and Stanislav Groysman; *Dalton Trans.,* 2016, 45, p. 9794; and 4) "Pseudotetrahedral $d^0$, $d^1$, and $d^2$ Metal-Oxo Cores within a Tris(alkoxide) Platform" by Stanislav Groysman, Dino Villagran, and Daniel G. Nocera, Inorganic Chemistry, (2010) 49(23), pp. 10759-10761.

There is still a need in the art for new and improved chromium-based catalyst compounds for the polymerization of olefins, in order to achieve specific polymer properties, such as high melting points, high molecular weights, to increase conversion or comonomer incorporation, or to alter comonomer distribution without negatively impacting the resulting polymer's properties.

SUMMARY OF THE INVENTION

In one aspect, this invention relates to a catalyst compound represented by the formula:

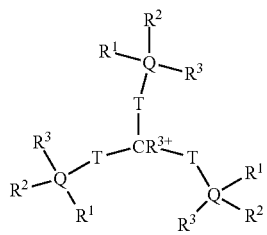

where each T is independently O, S or N, each Q is independently C or Si; each $R^1$, $R^2$, and $R^3$ is independently H, a substituted $C_1$ to $C_{40}$ hydrocarbyl group, a $C_1$ to $C_{40}$ hydrocarbyl group, or a substituted heteroatom, provided that the sum of the molecular volume of $R^1$, $R^2$, and $R^3$ is greater than or equal to two times the molecular volume of an isopropyl group and further provided that, if $R^1$ is t-butyl and $R^2$ is t-butyl, then $R^3$ is not methyl.

In another aspect, the invention relates to a catalyst system comprising an activator and a catalyst compound represented by the formula:

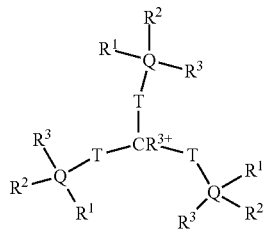

where each T is independently O, S or N, each Q is independently C or Si; each $R^1$, $R^2$, and $R^3$ is independently H, a substituted $C_1$ to $C_{40}$ hydrocarbyl group, a $C_1$ to $C_{40}$ hydrocarbyl group, or a substituted heteroatom, provided that the sum of the molecular volume of $R^1$, $R^2$, and $R^3$ is greater than or equal to two times the molecular volume of an isopropyl group.

In a further aspect, the invention relates to a process for polymerizing olefins comprising contacting one or more olefins with a catalyst system comprising an activator and a catalyst compound represented by the formula:

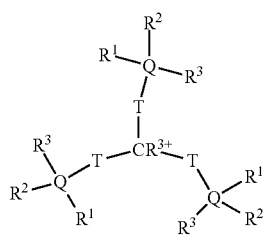

where each T is independently O, S or N, each Q is independently C or Si; each $R^1$, $R^2$, and $R^3$ is independently H, a substituted $C_1$ to $C_{40}$ hydrocarbyl group, a $C_1$ to $C_{40}$ hydrocarbyl group, or a substituted heteroatom, provided that the sum of the molecular volume of $R^1$, $R^2$, and $R^3$ is greater than or equal to two times the molecular volume of an isopropyl group.

DETAILED DESCRIPTION

Definitions

"Molecular volume" is used herein as an approximation of spatial steric bulk of a molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV = 8.3 V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For the purposes of this invention and the claims thereto, the new numbering scheme for the Periodic Table Groups is used as described in CHEMICAL AND ENGINEERING NEWS, 63(5), pg. 27, (1985). Therefore, a "group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: $P/(T \times W)$ and expressed in units of $gPgcat^{-1} hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

The following abbreviations may be used through this specification: Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THF (also referred to as the is tetrahydrofuran, RT is room temperature (and is 23° C. unless otherwise indicated), tol is toluene, EtOAc is ethyl acetate, and Cy is cyclohexyl.

For purposes of this invention and claims thereto, the term "substituted" means that a hydrogen group has been replaced with a hydrocarbyl group, a heteroatom, or a heteroatom-containing group. For example, a "substituted hydrocarbyl" is a radical made of carbon and hydrogen where at least one hydrogen is replaced by a hydrocarbyl, a heteroatom or heteroatom-containing group and a "substituted phenyl" is a phenyl where at least one (or two, three, four, five, or six) hydrogen is replaced by a hydrocarbyl, a heteroatom or heteroatom-containing group, such as methyl phenyl. Likewise, a "silylcarbyl" is a silyl group comprising an Si atom and at least hydrocarbyl group (such as trimethylsilyl), and a "substituted silylcarbyl" is "silylcarbyl" where at least one hydrogen is replaced by a hydrocarbyl, a heteroatom or heteroatom-containing group. A heteroatom is any atom other than C or H, and a substituted heteroatom is a heteroatom where the heteroatom is bound to a heteroatom (which may be the same or different), a hydrocarbyl group or substituted hydrocarbyl group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues. Preferred substituted hydrocarbyl radicals are radicals in which at least one hydrogen atom of the hydrocarbyl radical has been substituted with at least one halogen (such as Br, Cl, F, or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be, optionally, substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "alkoxy" or "alkoxide" means an alkyl ether or aryl ether radical wherein the term alkyl is as defined above, preferably $C_1$ to $C_{10}$ hydrocarbyl. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The term "aryl" or "aryl group" means a six-carbon aromatic ring and the substituted variants thereof, including but not limited to, phenyl, 2-methyl-phenyl, xylyl, 4-bromo-xylyl. Likewise heteroaryl means an aryl group where a ring carbon atom (or two- or three-ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six-ring atoms and tetrahydrofuran has five ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

Catalyst Compounds

The catalyst compounds employed herein comprise at least one trivalent chromium compound of the formula (I):

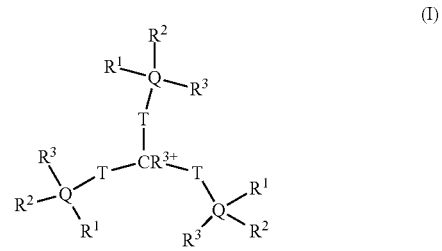

where each T is independently O, S or N, each Q is independently C or Si; each $R^1$, $R^2$, and $R^3$ is independently H, a substituted $C_1$ to $C_{40}$ hydrocarbyl group, a $C_1$ to $C_{40}$ hydrocarbyl group, or a substituted heteroatom, provided that the sum of the molecular volume of $R^1$, $R^2$, and $R^3$ is greater than or equal to two times the molecular volume of an isopropyl group.

In some embodiments, $R^1$, $R^2$, and $R^3$ can be $SiR^4_3$ where each $R^4$ is independently a $C_1$ to $C_{12}$ alkyl (such as methyl, ethyl, propyl, butyl, pentyl, hexyl, heptyl, octyl, nonyl, decyl, undecyl, dodecyl, or phenyl), preferably at least two, preferably all three of $R^4$, $R^2$, and $R^3$ can be $SiR^4_3$ where $R^4$ is a $C_1$ to $C_{12}$ alkyl (preferably methyl, ethyl, propyl, butyl, pentyl, hexyl, heptyl, octyl, nonyl, decyl, undecyl, dodecyl, or phenyl).

In some embodiments, $R^1$, $R^2$, and or $R^3$ may be a substituted heteroatom, such as a oxysilylcarbyl or a substituted oxysilylcarbyl, a silylcarbyl, or a substituted silylcarbyl.

In some embodiments, one, two, or three of $R^1$, $R^2$, and $R^3$ can be Z-$DR^5_3$ where Z is a heteroatom selected from Group 16 of the periodic table (such as O or S), D is C or Si, and each $R^5$ is independently a $C_1$ to $C_{12}$ alkyl (such as methyl, ethyl, propyl, butyl, pentyl, hexyl, heptyl, octyl, nonyl, decyl, undecyl, dodecyl, or phenyl), preferably at least two, preferably all three of $R^1$, $R^2$, and $R^3$ can be Z-DR$^5_3$ where Z is a heteroatom selected from Group 16 of the periodic table (such as O or S, preferably O), D is C or Si, and each $R^5$ is independently a $C_1$ to $C_{12}$ alkyl (preferably methyl, ethyl, propyl, butyl, pentyl, hexyl, heptyl, octyl, nonyl, decyl, undecyl, dodecyl, or phenyl).

In some embodiments, at least one T atom is N, alternately at least two T atoms are N, alternately all three T atoms are N.

In some embodiments, at least one T atom is S, alternately at least two T atoms are S, alternately all three T atoms are S.

In some embodiments, at least one T atom is O, alternately at least two T atoms are O, alternately all three T atoms are O.

In some embodiments, at least one Q atom is C, alternately at least two Q atoms are C, alternately all three Q atoms are C.

In some embodiments, at least one Q atom is Si, alternately at least two Q atoms are Si, alternately all three Q atoms are Si.

In some embodiments, Q can be C when T is O, alternately two Q atoms are C and two T atoms are O, alternately three Q atoms are C and three T atoms are O.

In some embodiments, each $R^1$, $R^2$, and $R^3$ is independently a $C_1$ to $C_{10}$ hydrocarbyl group, for example, methyl, ethyl, propyl, butyl, pentyl, hexyl, heptyl, octyl, nonyl, decyl, undecyl, dodecyl, phenyl, or substituted phenyl, preferably methyl, ethyl, n-propyl, iso-propyl, n-butyl, sec-butyl, t-butyl, phenyl, methylphenyl, or biphenyl.

In embodiments, each $R^1$, $R^2$, and $R^3$ is independently a $C_1$ to $C_{10}$ alkyl group or an aryl group.

Examples of suitable catalyst compounds include $Cr(OCPh(t-Bu)_2)_3$ and $Cr(OC(t-Bu)Ph_2)_3$, $Cr(OCPh_3)_3$, $Cr(OC(t-Bu)_3)_3$, $Cr(OC(t-Bu)(i-Pr)_2)_3$, $Cr(OC(t-Bu)_2(i-Pr))_3$, $Cr(OC(i-Pr)_3)_3$, $Cr(OCMe(i-Pr)_2)_3$, $Cr(OC(SiMe_3)(i-Pr)_2)_3$, $Cr(OC(SiMe_3)_2(i-Pr))_3$, $Cr(OC(SiMe_3)_2Me)_3$, $Cr(OC(SiMe_3)_2Et)_3$, $Cr(OCEt(i-Pr)_2)_3$, $Cr(OC(t-Bu)_2Et)_3$, $Cr(SC(t-Bu)Ph_2)_3$, $Cr(SCPh_3)_3$, $Cr(SC(t-Bu)_3)_3$, $Cr(SC(t-Bu)(i-Pr)_2)_3$, $Cr(SC(t-Bu)_2(i-Pr))_3$, $Cr(SC(i-Pr)_3)_3$, $Cr(SCMe(i-Pr)_2)_3$, $Cr(SC(SiMe_3)(i-Pr)_2)_3$, $Cr(SC(SiMe_3)_2(i-Pr))_3$, $Cr(SC(SiMe_3)_2Me)_3$, $Cr(SC(SiMe_3)_2Et)_3$, $Cr(SCEt(i-Pr)_2)_3$, $Cr(SC(t-Bu)_2Et)_3$, $Cr[O—Si(O—SiMe_3)]_3$, and $Cr[O—Si(O—CMe_3)]_3$.

It is believed that compounds of formula (I), in which each of $R^1$ and $R^2$ is t-butyl and $R^3$ is methyl, have not been utilized as olefin polymerization catalysts.

In some embodiments, two or more different catalyst compounds [at least one being a compound of formula (I), alternately both of which are represented by formula (I)] are present in the catalyst system used herein. In some embodiments, two or more different catalyst compounds are present in the reaction zone where the process(es) described herein occur. When two transition metal compound-based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators can be used in combination.

The two transition metal compounds (pre-catalysts) may be used in any ratio. Preferred molar ratios of (A) transition metal compound to (B) other transition metal compound fall within the range of (A:B) is 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Compounds of formula (I) can be prepared by reacting an alkali metal salt, such as a lithium salt, of the relevant ligand with a suitable chromium salt, such as a chromium halide.

For example, $Cr(OCPh(t-Bu)_2)_3$ can be prepared by reacting $(t-Bu)_2PhCOLi$ with $CrCl_3$ in a solvent mixture containing hexane, ether, and THF.

This invention also relates to a catalyst system and process for use thereof. In particular, the catalyst system comprises a pre-catalsyt compound, an optional support material, and an activator. The catalyst system may be used for olefin polymerization processes. A typical system includes at least one pre-catalyst, at least one activator, and optional support. Supported catalyst systems can be used in heterogeneous polymerization processes, often in slurry or gas phase polymerization processes.

The catalyst systems may be formed by combining the above pre-catalyst components with activators in any manner known from the literature including by supporting them for use in slurry or gas phase polymerization.

Activators

The terms "cocatalyst" and "activator" are used herein interchangeably and are defined to be any compound which can render any one of the catalyst compounds described above active for polymerization of olefins.

After the complexes described above have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically comprises a complex as described above and an activator.

Non-limiting activators, for example, include alumoxanes, aluminum alkyls, and conventional-type cocatalysts. Preferred activators typically include alumoxane compounds and modified alumoxane compounds.

In one embodiment, alumoxane activators are utilized as an activator in the catalyst system of the invention. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst compound ratio is generally a 1:1 molar ratio. Alternate preferred ranges include from 1:1 to 500:1, alternately from 1:1 to 200:1, alternately from 1:1 to 100:1, or alternately from 1:1 to 50:1.

Aluminum alkyl compounds can also be used as activators. Useful aluminum alkyl compounds include compounds represented by the formula $AlR_3$, where each R is, independently, a $C_1$-$C_8$ aliphatic radical, preferably methyl, ethyl, propyl, butyl, pentyl, hexyl octyl, an isomer thereof, or a combination thereof, such as trimethylaluminum, triisobutylaluminum, trioctylaluminum, or a combination thereof.

In addition to these activator compounds, scavengers or co-activators may be used. Aluminum alkyl, organoaluminum, or other organometallic compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably, the surface area of the support material is in the range from about 100 to about 400 $m^2/g$, pore volume from about 0.8 to about 3.0 cc/g, and average particle size is from about 5 to about 100 μm. The average pore size of the support material useful in the invention is in the range of from about 10 to about 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON™ 952 or DAVISON™ 955 by the Davison™ Chemical Division of W.R. Grace and Company. In other embodiments DAVISON™ 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiments, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as ethylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. In a preferred embodiment of the invention, the monomer comprises propylene and an optional comonomer comprises one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In some embodiments, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, or preferably 300 ppm or less. In other embodiments, at least 50 ppm of diene is added to the polymerization, or 100 ppm or more, or 150 ppm or more.

Preferred diolefin monomers useful in this invention include any hydrocarbon structure, preferably with 4 to 30 carbon atoms, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring-containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene).

In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Polymerization can be conducted at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, and diethyl zinc.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators.

Preferred aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide.

Polyolefin Products

This invention also relates to compositions of matter produced by the methods described herein.

In a preferred embodiment, the process described herein produces ethylene homopolymers or ethylene copolymers, such as ethylene-alphaolefin (preferably $C_3$ to $C_{20}$) copolymers (such as ethylene-butene copolymers, ethylene-hexene and/or ethylene-octene copolymers) having: a Mw/Mn of greater than 1 to 4 (preferably greater than 1 to 3).

Likewise, the process of this invention produces ethylene copolymers. In a preferred embodiment, the copolymers produced herein have from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, and/or octene).

In a preferred embodiment, the monomer is ethylene and the comonomer is hexene, preferably from 1 to 15 mol % hexene, alternately 2 to 10 mol %.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

EXPERIMENTAL

The invention will now be more particularly described with reference to the following non-limiting Examples.

In the Examples, gel permeation chromatography (GPC) was performed on a Waters Alliance GPC 2000 or a PL GPC 220 (Agilent Technologies) equipped with a differential refractive index (DRI) detector. The solvent consisted of 1,2,4-trichlorobenzene (Sigma Aldrich, Chromasolv grade ≥99% purity) stabilized with 1000 ppm of 2,6-di-tert-butyl-4-methylphenol (Sigma Aldrich) and was filtered using a membrane filter (Millipore, polytetrafluoroethylene, 0.1 µm). All samples were dissolved at a concentration of approximately 0.5 to 1.5 mg/mL in this solvent. Dissolution was carried out at 160° C. in a shaker oven for 2-3 hours. The samples were immediately transferred to a sample carousel maintained at 145° C. (Waters Alliance GPC 2000) or an auto-sampler maintained at 150-160° C. (PL GPC 200). Separation was effected by three Mixed B columns in series (Agilent Technologies, PL-Gel 10 µm 300 mm×7.5 mm) at 145° C. (Waters Alliance GPC 2000) or 160° C. (PL GPC 200). The solvent was passed through an in-line filter (Optimize Technologies, SS frit, 2 µm) prior to entering the columns at a fixed flow rate of 1.0 mL/min.

Molecular weight was determined by a conventional calibration as described below using a set of seventeen narrow polystyrene standards (Agilent Technologies) with peak molecular weights (Mp) from ~1000 to ~10,000,000 g/mol and Mw/Mn≤1.10. Mp for the polystyrene standard provided on the certificate of analysis from the manufacturer acquired through independent characterization by viscometry and light scattering was used for calibration. The conventional calibration curve was generated by fitting a second order polynomial to a plot of the log Mp vs. retention volume for the polystyrene standards in Microsoft Excel (Version 14.0.7113.5000). Using this calibration and the Mark-Houwink expression, molecular weight moments were determined for polyolefins of known composition.

The $^1$H solution NMR for hexene content determination was performed at a field of at least 500 MHz in tetrachloroethane-d2 solvent at 120° C. with a flip angle of 30°, 5 s delay, and 120 transients. Signals were integrated and the numbers of methyl groups per 1000 carbons were reported. The spectrum was referenced to the PE backbone at 1.34 ppm. Methyl groups per 1000 carbons was calculated by taking the methyl region (0.85-1.05 ppm) and the aliphatic region (0-2.1 ppm). (Methyl/3)*1000/(aliphatic/2) gives branches per 1000 carbons.

Example 1: Pre-Catalyst Preparation

Preparation of (t-Bu)$_2$PhCOLi 10.393 g (73.067 mmol) of hexamethylacetone was dissolved in 100 mL of ether. To this solution was added 34.8 mL of a 2.1 M solution (73 mmol) of phenyllithium in ether. The reaction mixture was stirred at room temperature for 24 hours, at which point, volatiles were removed. The solid residue was crystallized from hexanes, yielding 10.848 g of the desired product.

Preparation of Cr(OC(t-Bu)$_2$pH)$_3$ 4.615 g (20.40 mmol) of (t-Bu)$_2$PhCOLi was dissolved in 50 mL of hexane. To the stirred solution was added 1.076 g (6.793 mmol) of anhydrous chromium(III) chloride. The reaction mixture was stirred at room temperature for 30 minutes, and then 5 mL of ether were added. The reaction mixture was stirred for 30 minutes further, and 10 mL of tetrahydrofuran (THF) was added. The reaction mixture was then stirred at room temperature for 16 hours. It was pumped to dryness in vacuo, and the residue was tritrated with toluene. The residue was then extracted into pentane and filtered through Celite. The filtrate was pumped to dryness in vacuo, and then redissolved in a minimal amount of pentane. This solution was chilled to −30° C. overnight, yielding 1.595 g of green crystalline material.

Preparation of MAO Supported on Silica

In a nitrogen filled glovebox, 2 kg of toluene and 1 kg of a 30 wt % MAO solution in toluene were added to a reactor and stirred for 5 minutes. To this solution was added 800 g of silica (D948 obtained from Grace) which had been calcined at 600° C. prior to use. Approximately 100 g of additional toluene was used to wash the silica into the reactor. The reactor was then heated to 100° C. and stirred for 3 hours, followed by an additional 2 hours of stirring while the contents were cooled down to 35° C. The mixture was then placed under vacuum for 5 days, after which the dry silica-supported MAO was unloaded.

Catalyst Activation

Catalyst activation was performed in a nitrogen-filled glovebox via two different pathways—in solution phase for Polymerization Runs 1 and 2 and on a silica support for Polymerization Runs 3 to 5.

In the case of solution phase activation, approximately 2.5 µmol of pre-catalyst was dissolved in minimal toluene. 250 equivalents of MAO was then added as a 30 wt % toluene solution, and this mixture was stirred for two minutes. The stirred catalyst solution was then loaded into a catalyst tube for ensuing injection into the reactor. Activation for Polymerization Run 2 was performed with extended reaction time between the pre-catalyst and the MAO (30 minutes).

Activation was also performed on a silica support. In this method, 40 µmol of the pre-catalyst was dissolved in 1 g of toluene, and then 465 mg (8 mmol) of a 30 wt % solution of MAO in toluene was added and the mixture stirred for 10 minutes. This solution was then added to 1 g of D948 600° C. calcined silica. This mixture was stirred via spatula for 10 minutes and then dried in vacuo overnight. In the case of Runs 3 and 5, activation was similarly performed using silica onto which MAO had been pre-supported (see preparation procedure above). In this case, 40 µmol of pre-catalyst was dissolved in approximately 1 g of toluene and then added to 1 g of the prepared silica-supported-MAO. This mixture was stirred by spatula for 10 minutes and then dried in vacuo overnight.

Polymerization Runs

A 2 L steel autoclave reactor was purged with nitrogen for 1 hour at 90° C., and then allowed to cool under nitrogen flow. A mixture of 1-hexene comonomer, 2 mL of a 0.11 M solution of tri-n-octylaluminum in hexane, and 700 mL of isohexane was added to the cooled reactor as a continuous stream via a counter-pressure of nitrogen. Excess nitrogen was subsequently vented off, and the reactor was heated to 80° C. while stirring at approximately 500 rpm. A total of 130 psi of ethylene was then fed into the reactor, with the last 20 psi also used to inject a 2 mL toluene solution containing the catalyst and activator (previously prepared in a glovebox with gentle stirring), or a toluene slurry of the supported catalyst. The reactor was subsequently stirred at 80° C. for 1 hour (unless otherwise noted), with additional ethylene flow controlled via regulator and measured by a flow meter. Afterwards the reactor was cooled, vented to the air, and emptied by hand. The polymer was isolated after evaporation of the solvent.

TABLE 1

| Run | µmol catalyst | µmol MAO | Solution/ Supported | Yield (g) | Wt. % hexene | $M_n$ | $M_w$ | $M_w/M_n$ |
|---|---|---|---|---|---|---|---|---|
| 1 | 2.7 | 492 | Solution | 0.79 | 3.77 | $1.54 \times 10^5$ | $5.53 \times 10^5$ | 3.59 |
| 2 | 2.8 | 541 | Solution | 1.67 | 2.33 | $5.16 \times 10^5$ | $9.73 \times 10^5$ | 1.88 |
| 3 | 2.2 | 339 | Supported | 1.54 | 4.88 | $6.88 \times 10^4$ | $5.52 \times 10^5$ | 8.02 |
| 4 | 2.02 | 410 | Supported | 0.59 | 2.54 | $2.52 \times 10^5$ | $1.07 \times 10^6$ | 4.23 |
| 5* | 2.02 | 311 | Supported | 2.14 | 2.24 | $3.14 \times 10^5$ | $1.05 \times 10^6$ | 3.35 |

*Polymerization run at 85° C.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A catalyst compound comprising $Cr(OCPh(t-Bu)_2)_3$.

* * * * *